United States Patent
Ahmed et al.

(10) Patent No.: US 6,878,410 B2
(45) Date of Patent: Apr. 12, 2005

(54) METHOD FOR PROTECTING SURFACES FROM EFFECTS OF FIRE

(75) Inventors: Farooq Ahmed, Guelph (CA); Faisal Huda, Toronto (CA); Seraj Ul Huda, Toronto (CA); John Barr, Eden Mills (CA)

(73) Assignee: CSL Silicones Inc., Toronto (*) Notice: Subject to any disclaimer, the term of this patent is extended or adjusted under 35 U.S.C. 154(b) by 14 days.

(21) Appl. No.: 10/375,016

(22) Filed: Feb. 28, 2003

(65) Prior Publication Data

US 2004/0170768 A1 Sep. 2, 2004

(51) Int. Cl.[7] ............................... B05D 3/02
(52) U.S. Cl. ............................... 427/387
(58) Field of Search ........................... 427/387

(56) References Cited

U.S. PATENT DOCUMENTS

| | | | |
|---|---|---|---|
| 4,419,474 A | * 12/1983 | Ackermann et al. | ........ 524/195 |
| 4,567,085 A | 1/1986 | Mathias et al. | |
| 4,678,827 A | 7/1987 | Takeo et al. | |
| 6,271,299 B1 | 8/2001 | Alvarez | |
| 6,395,815 B1 | * 5/2002 | Tkaczyk et al. | ........ 524/449 |
| 6,433,049 B1 | * 8/2002 | Romenesko et al. | ........ 524/456 |

FOREIGN PATENT DOCUMENTS

| | | | |
|---|---|---|---|
| EP | 150385 | * | 8/1985 |
| JP | 2001-207152 | * | 7/2001 |
| JP | 2003-039622 | * | 2/2003 |

OTHER PUBLICATIONS

Sandor et al, Journal of Applied Polymer Science, 67(10), pp 1739–1752, 1998.*

* cited by examiner

*Primary Examiner*—Erma Cameron

(57) ABSTRACT

The present invention provides for a method of protecting a surface from the effects of a fire by coating the surface with at least about a 2 mm coating of a polysiloxane composition containing a fire retardant filler which provides for excellent exterior durability as well as resistance to heat and fire. In preferred embodiments of the invention the fire retardant filler is melamine and the polysiloxane composition is a one part room temperature vulcanizable composition which cures through exposure to moisture.

6 Claims, 2 Drawing Sheets

METHOD FOR PROTECTING SURFACES FROM EFFECTS OF FIRE

FIELD OF THE INVENTION

The present invention relates to a method of protecting a surface from the effects of a fire by coating the surface with at least about a 2 mm coating of a fire retardant, fire resistant, and heat resistant, vulcanizable silicone composition. In particular, the vulcanizable silicone composition resists fire with excellent resistance to heat transfer that may cause damage to the structure to which the silicone composition is coated.

BACKGROUND OF THE INVENTION

Fire resistant products have extensive use in modern construction. Beside its fire retardant properties, an ideal fire resistant product should also insulate the heat evolved as a result of an extensive fire. It should also have no or minimal emission of toxic gases. These features minimize structural damage during fire and allow any occupants sufficient time to leave the area relatively safely. Examples of fire resistant products are described in U.S. Pat. Nos. 6,387,993, 6,395,815, 6,444,736, 6,441,122, and 6,433,049.

Batdorf in U.S. Pat. No. 6,387,993 describes water-based flame retardant compositions using polyvinylpyrrolidone polymer. The patent does not describe insulation of the surface from heat.

Tkaczyk et al in U.S. Pat. No. 6,395,815 describes a silicone composition with improved high temperature resistance suitable for insulating electrical wires. The patent does not describe or claim any flame or fire rating for this product.

Touhara et al in U.S. Pat. No. 6,444,736 describes a polyolefin composition to be used as a non-toxic flame retardant sealing or coating. This patent does not describe heat insulation, which minimizes the damage of the structure during fire.

DeMott et al in U.S. Pat. No. 6,441,122 describes the use of melamine in urea extended phenol formaldehyde alkaline resole binder. This binder product is only suitable for fiberglass and is not intended for use as a flame retardant.

Romaneski et al in U.S. Pat. No. 6,433,049 describe the formulation of thermoplastic silicone vulcanizate for fire resistance. The fire resistant product is described as generating less heat energy but does not describe heat resistance at elevated temperature during high-intensity fire.

There thus remains a need for providing a surface with protection against the effects of flame, fire and heat.

SUMMARY OF THE INVENTION

The present invention provides for a method of protecting a surface from the effects of a fire by coating the surface with at least about a 2 mm coating of a polysiloxane composition containing a fire retardant filler which provides for excellent exterior durability as well as resistance to heat and fire.

In an aspect of the invention the fire retardant filler is melamine.

In yet another aspect, the method of the present invention utilizes a one-part room temperature vulcanizing organopolysiloxane rubber composition comprising the product which is obtained by mixing the following:

a) from about 20 to about 60 weight percent of one or more polydiorganosiloxane fluids of the formula $$R'[(R)_2SiO]_n(R)_2SiR'$$

in which R is a monovalent alkyl or alkenyl radical having 1 to 8 carbon atoms or a phenyl radical R' each of which may be the same or different are OH or a monovalent alkyl or alkenyl radical having 1 to 8 carbon atoms or a phenyl radical and n has an average value such that the viscosity is from about 1 to about 100,000 centipoise at 25° C., wherein at least one of the polyorganosiloxane fluids has both R' equal to OH and n has an average value such that the viscosity is in the range from 1,000 to 100,000 centipoise at 25° C., preferably from 1,000 to 40,000 centipoise at 25° C.;

b) from 0 to about 40 weight percent of a cyclo-organosiloxane of the formula $$[(R)_2SiO]_n$$

in which R is a monovalent alkyl or alkenyl radical having 1 to 8 carbon atoms or a phenyl radical which may optionally be substituted with an alkyl radical having 1 to 8 carbon atoms and n has an average value of 3 to 10;

c) from 5 to about 50 weight percent of one or more fire retardant fillets selected from the group consisting of melamine, zirconium dioxide, chromium dioxide, zinc borate, antimony oxide and exfoliated graphite;

d) from about 0 to about 30 weight percent of one or more inorganic extending or non-reinforcing fillers; such as quartz, diatomaceous earth, barium sulfate, calcium carbonate, titanium dioxide etc.

e) from about 0.5 to about 10 weight percent of an amorphous $SiO_2$ reinforcing filler having a surface area of between about 50 to 300 $m^2/g$ and a particle size range between about 0.01 and 0.03 microns;

f) from about 1 to about 7 weight percent of a silane cross-linking agent of the formula;

$$RSiX_3$$

in which R is a monovalent alkyl or alkenyl radical having 1 to 8 carbon atoms or a phenyl radical which may optionally be substituted with an alkyl radical having 1 to 8 carbon atoms and X is an alkyl radical with a functional group selected from carboxyl, ketoximino, alkoxy, carbonyl and amine directly linked to the silicone atom;

g) from about 0.2 to about 3 weight percent of an organosilane adhesion promoter; and h) from about 0.02 to about 3 weight percent of an organotin salt as a condensation catalyst.

BRIEF DESCRIPTION OF THE DRAWINGS

Preferred embodiments of the present invention are illustrated in the attached drawings in which.

DETAILED DESCRIPTION OF THE PREFERRED EMBODIMENTS

Figure 1:
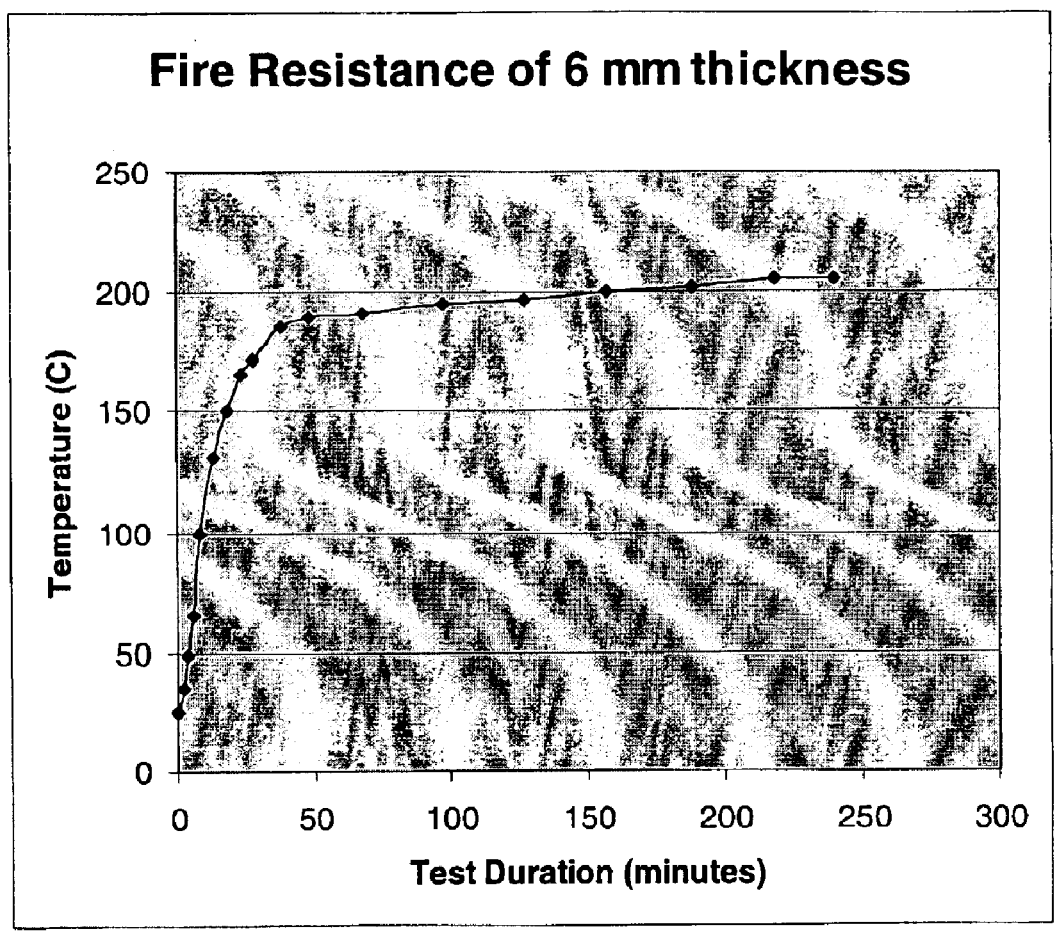
FIG. 1 is a plot of temperatures versus time of exposure to a direct flame at 1200° C. for a 6 mm thick fire retardant coating in accordance with the present invention.

The present invention provides for a method of protecting a surface from the effects of a fire by coating the surface with at least about a 2 mm coating of a polysiloxane composition containing a fire retardant filler which provides for excellent exterior durability as well as resistance to heat and fire.

The polyorganosiloxane compositions containing the fire retardant filler utilized in the present invention possess excellent fire resistance, flame retardant and thermal insulation properties. The compositions when coated on metal structures can provide excellent resistance from the effects of high-intensity fire by heat insulation. The compositions may be coated on the structures by any of the commonly employed methods such as brushing, spraying etc.

The composition utilized in the present invention comprises a vulcanizable polyorganosiloxane and a flame or fire retardant additive which provides the composition with its excellent fire resistance, flame retardant and thermal insulation properties.

The vulcanizable polyorganosiloxane may be any of the commonly utilized vulcanizing compositions utilizing one part or two part systems cured catalytically, for example through addition curing, or utilizing moisture curing systems.

Catalytically polymerizable polyorganosiloxane compositions using addition cure systems are not controlled by moisture of the atmosphere. High temperature can accelerate the curing process although the crosslinking addition reaction may also occur at room temperature. The base polymer is generally a polydiorganosiloxane of general formula

R"[(R)$_2$SiO]n(R)$_2$SiR"

where R is a monovalent alkyl or alkenyl radical having 1 to 8 carbon atoms, optionally substituted with 1 to 9 halogen atoms, or a phenyl radical, optionally substituted with 1 to 6 halogen atoms R" is monovalent alkenyl radical (preferably a monovalent vinyl or ethylene radical) and n has an average value such that the viscosity is from 100 to 100,000 centipoise. An example of such a base polymer is

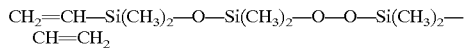
CH$_2$=CH—Si(CH$_3$)$_2$—O—Si(CH$_3$)$_2$—O—O—Si(CH$_3$)$_2$—CH=CH$_2$ The addition cure systems utilize a crosslinker to polymerize the base polymer. The crosslinker is generally a polydiorganosiloxane of general formula

R[(R)(H)SiO]m[(R)2SiO]nR where each R which may be the same or different is a monovalent alkyl or alkenyl radical having 1 to 8 carbon atoms, optionally substituted with 1 to 9 halogen atoms, or phenyl radical, optionally substituted with 1 to 6 halogen atoms and H is hydride radical, m and n are integers and their total average value is such that the viscosity is from 10 to 10,000 centipoise. The value of m is 10 to 50 percent of the value of m+n.

For optimum crosslinking the ratio of the alkenyl radical, preferably ethylene radical, to hydride radical is from 1:1 to 6:1.

The crosslinking reaction of addition cure systems requires a catalyst, generally an organometallic complex of Platinum of the formula:

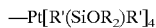
—Pt[R'(SiOR$_2$)R']$_4$

In which R is alkyl or alkenyl and R' is alkenyl. An example of such a platinum catalyst is
Platinum Divinyltetramethyldisiloxane complex

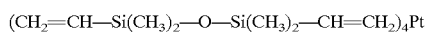
(CH$_2$=CH—Si(CH$_3$)$_2$—O—Si(CH$_3$)$_2$—CH=CH$_2$)$_4$Pt

Crosslinking by addition is an extremely fast reaction. The reaction speed can be controlled by reducing the amount of catalyst or by using a reaction inhibitor such as a vinyl terminated dimethylsiloxane that reduces the activity of the platinum catalyst.

An adhesion promoter may also be used for two-part addition cure system to improve the adhesion of the elastomer to the surface. The adhesion promoter is generally a silane having general formula

R'Si(R$^2$O)$_3$ where R$^1$ is an alkenyl radical, preferably a vinyl radical, R$^2$ is an alkyl radical having 1 to 6 carbon atoms.

Addition cure systems are generally provided in two-parts with the base polymer, crosslinker, adhesion promoter and inhibitor in one part and base polymer and catalyst in the other part. Fillers and pigment are added in either part to achieve equivalent viscosity of both parts for homogenous mixing.

Moisture curing systems are generally room temperature vulcanizable (RTV), although higher temperatures may be employed to accelerate the curing reaction. The moisture curing composition may be provided as a two part system similar to the addition cure compositions or may be a one part composition containing all of the components of the composition in a single container. Preferably for ease of handling and application, the RTV compositions are in one part.

Moisture cure systems generally utilize a hydroxyl terminated polyorganosiloxane as a base polymer. Preferably, the base polymer is one or more polyorganosiloxanes of the general formula:

R'[(R)$_2$SiO]n(R)$_2$SiR' in which R is a monovalent alkyl or alkylene radical having 1 to 8 carbon atoms or a phenyl radical, R' each of which may be the same or different are OH, a monovalent alkyl or alkylene radical having 1 to 8 carbon atoms or a phenyl radical and n has an average value such that the viscosity is from about 1000 to about 100,000 centipoise at 25° C. At least one of the R' has a reactive group such as OH or alkylene, preferably OH, most preferably both R' are OH.

The moisture curing systems utilize a crosslinker having the general formula:

X$_3$—Si—R where R is an alkyl, alkenyl or phenyl radical (preferably methyl or ethyl) and X an alkyl radical with a functional group linked directly to silicone atom. The functional group can be carboxyl, ketoximino, alkoxy, carbonyl or amine.

The commonly employed cross linkers for moisture cure RTV One-Part or Two-Part Systems include
Acetoxy Silane (CH$_3$C(O)O)$_3$—Si—R Releases Acetic Acid as curing by-product.
Oxime Silane (C$_2$H$_5$(CH$_3$)C=NO)$_3$—Si—R Releases methylethyl ketoxime as curing by-product.
Alkoxy Silane (R'O)$_3$—Si—R Where R' is a alkyl radical from 1 to 6 carbon. It releases alcohol as curing by-product.
Enoxy Silane (CH$_3$C(O)CH$_2$)$_3$—Si—R Releases Acetone as curing by-product.
Amine Silane ((CH$_3$)$_2$N)$_3$—Si—R Releases Amine as curing by-product. It is the fastest reacting crosslinker that does not require a catalyst.

To improve the crosslinking reaction, a catalyst is generally utilized. For moisture cure systems, one commonly employed catalyst is an organotin salt such as dibutyl tin dilaurate, among others.

To improve the adhesion of the elastomer to the surface on which it is coated, an adhesion promoter may be employed.

The adhesion promotor is commonly a compound of the formula

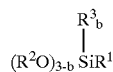

in which $R^2$ and $R^3$ are independently selected from monovalent alkyl or alkenyl radicals having 1 to 8 carbon atoms or phenyl radical which may optionally be substituted with an alkyl radical having 1 to 8 carbon atoms, b is an integer between 0 and 3, and $R^1$ is a saturated, unsaturated or aromatic hydrocarbon radical having 1 to 10 carbon atoms which may optionally contain a functional group.

In addition to the components required for the formation of the silicone elastomer, the composition also contains a fire retardant filler which provides the composition with its excellent fire resistance, flame retardant and thermal insulation properties. The fire retardant filler is preferably selected from the group consisting of melamine, zirconium dioxide, chromium dioxide, zinc borate, antimony oxide and exfoliated graphite. Most preferably the fire retardant filler is melamine. The fire retardant filler is generally present in the composition at a concentration of from 5 to about 50 weight percent of the total composition, more preferably from about 5 to about 30 weight percent of the total composition, most preferably from about 8 to about 20 weight percent of the total composition.

In addition to the above components, the composition may also include other optional components such as other fillers having extending, semi-reinforcing or reinforcing properties, pigments and diluents.

Other fillers may include silica, hollow glass beads, quartz, calcium carbonate, barium sulfate, diatomaceous earth etc. The amount of the other fillers in the composition will generally be from 0 to about 30 weight percent of the total composition depending upon the filler and the desired properties.

In order to improve the handling of the composition as it is being applied to the surface, the composition may be diluted with up to 35 weight percent of a diluent. The diluent may be an organic hydrocarbon solvent such as naphtha or it may be a low viscosity polyorganosiloxane such as a blocked linear low molecular weight organosiloxane or a cyclo-organosiloxane. Preferably, to eliminate volatile organic compounds (VOC), the diluent is a blocked linear low molecular weight organosiloxane or a cyclo-organosiloxane.

The method of the present invention involves coating a surface to be protected from the effects of a fire with at least a 2 mm thick coating of a polyorganosiloxane composition containing a fire retardant such that the surface resists fire with excellent resistance to heat transfer that may cause damage to the structure to which the silicone composition is coated. The surface to be protected is coated with the composition by conventional methods such as dipping, brushing or spraying.

Preferably, the surface to be protected is coated by spraying one or more applications of the fire retardant composition until a coating of the desired thickness is built up. The thickness of the coating will depend upon the specific requirements of the application and the desired level of protection. The coating generally has an average thickness of 2 to 50 mm, more preferably, an average thickness of 6 to 25 mm, most preferably about 10 to 25 mm. For the greater thicknesses, a two part polyorganosiloxane is preferred, although a one part may be used by building up the final thickness with a number of laayers applied on top of one another.

In a particularly preferred embodiment the composition utilized in the method of the present invention for use as a fire protective coating is a one-part organopolysiloxane rubber compositions containing about 20 to about 60 weight percent of one or more polydimethylsiloxane fluids of the formula:

in which R is a monovalent alkyl or alkenyl radical having 1 to 8 carbon atoms or a phenyl radical, R' each of which may be the same or different are OH or a monovalent alkyl or alkenyl radical having 1 to 8 carbon atoms or a phenyl radical and n has an average value such that the viscosity is from about 1 to about 100,000 centipoise at 25° C. At least one of the polyorganosiloxane fluids is a higher viscosity siloxane having reactive groups in which both of the R' is equal to OH and n has an average value such that the viscosity is in the range from 1,000 to 100,000 centipoise at 25° C., preferably from 1,000 to 40,000 centipoise at 25° C. The polydimethylsiloxanes may contain small amounts of monomethylsiloxane units and methyl radical replaced with other radicals in small amounts as impurities such as is found in commercial products, but the preferred fluid contains only polydimethylsiloxane.

The composition of this preferred embodiment may contain a second linear dimethyl polysiloxane of low molecular weight to act as a viscosity reducer diluent for the composition for ease in applying the composition to the surface. The low molecular weight linear dimethyl polysiloxanes are end blocked oligomeric compounds of the above formula where R, and R' which may be the same or different, are independently selected from a monovalent alkyl or alkenyl radical having 1 to 8 carbon atoms or phenyl radical. The average value of n ranges between 4 and 24, preferably between 4 and 20.

If the composition contains the two different polysiloxanes set out above, the total of the polysiloxanes is generally about 40 to 60 weight percent with the relative amounts of the two polysiloxanes being selected based upon the desired characteristics of the final coating. Generally each of the polysiloxanes will be present in a ratio of from about 30 weight percent to about 70 weight percent based upon the total weight of the polysiloxane fluids.

In addition to, or in place of the low molecular weight linear dimethyl polysiloxanes, the composition may contain up to about 40 weight percent, more preferably 20 to 30 weight percent of a cyclo-organosiloxane of the formula:

in which R is a monovalent alkyl or alkenyl radical having 1 to 8 carbon atoms or a phenyl radical which may optionally be substituted with an alkyl radical having 1 to 8 carbon atoms and n has an average value of 3 to 10. The preferred cycloorganosiloxane is a cyclic dimethylsiloxane and is used in a similar manner to the low molecular weight linear dimethyl polysiloxanes as a diluent to lower the viscosity of the composition for convenient application by spraying, brushing or dipping.

The composition also contains 5 to 50 weight percent, more preferably 5 to 30 weight percent of one or more fire retardant fillers selected from the group consisting of melamine, zirconium dioxide, chromium dioxide, zinc borate, antimony oxide, alumina trihydrate and exfoliated graphite. Preferably, the composition contains from about 8 to about 20 weight percent of melamine as a fire retardant filler.

The composition may also contain inorganic extending or non-reinforcing fillers. The extending fillers are preferably selected from inorganic materials such as hollow glass beads, calcium carbonate, barium sulfate, diatomaceous earth, quartz, crystalline silica, titanium dioxide, alumina trihydrate, and zinc oxide. The selection of the filler will be based upon the required properties and the final usage of the composition. For coatings requiring higher strength crystalline silica is utilized.

The composition also contains about 0.5 to 10 weight percent of an amorphous $SiO_2$ reinforcing filler having a surface area of between about 50 to 300 $m^2/g$ and a particle size range between about 0.01 and 0.03 microns. The specific gravity of the filler is preferably about 2.2. The amorphous $SiO_2$ reinforcing filler may be untreated or surface treated with for example polyorganosilane or silane.

The composition also contains about 1 to 7 weight percent, preferably 2 to 5 weight percent of a cross linkage agent, preferably an oximinosilane cross linking agent. Preferably the oximinosilane cross linking agent is of the formula $RSi(ON=CR'_2)_3$ in which R and R' each represent a monovalent alkyl or alkenyl radical having 1 to 8carbon atoms or a phenyl radical, preferably an alkyl radical such as methyl, ethyl, propyl, butyl, or an alkenyl radical such as vinyl, allyl, or a phenyl radical. The preferred R and R' are alkyl or vinyl radicals, most preferably methyl and ethyl radicals.

The composition also contains about 0.2 to 3 weight percent of an organo functional silane as an adhesion promoter. Preferably the organo functional silane has the formula

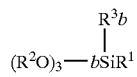

wherein $R^2$ and $R^3$ are independently selected from monovalent alkyl or alkenyl radicals being 1 to 8 carbon atoms or a phenyl radical, b is an integer from 0 to 3, preferably 0, and $R^1$ is a saturated, unsaturated or aromatic hydrocarbon radical being 1 to 10 carbon atoms, which may be further functionalized by a member selected from the group consisting of amino, ether, epoxy, isocyanate, cyano, acryloxy acyloxy and combinations thereof. $R^2$ and $R^3$ are preferably an alkyl radical such as, for example, methyl, ethyl, propyl, butyl, or an alkenyl radical such as vinyl and allyl. More preferably $R^2$ and $R^3$ are alkyl radicals, most preferably methyl, ethyl, or propyl radicals. Preferably $R^1$ is an alkyl group, more preferably further functionalized by one or more amino groups. The most preferred organo-functional silane is N-(2-aminoethyl-3-aminopropyl)trimethoxysilane.

In all of the above compounds, the alkyl includes straight, branched or cyclic radicals. Among the alkyl groups are C1–8 straight or branched-chain alkyl such as, for example, methyl, ethyl, propyl, isopropyl, n-butyl, isobutyl, tert-butyl, pentyl, isopentyl, hexyl, etc., the cycloalkyl are C3–8 cycloalkyl such as, for example, cyclopropyl, cyclobutyl, cyclohexyl, etc., the alkenyl groups are C1–8 alkenyl such as, for example, vinyl and allyl. The above groups as well as the phenyl radicals may be further functionalized by including in the chain or ring structure, as the case may be, a group selected from the class consisting of amino, ether, epoxy, isocyanate, cyano, acryloxy, acyloxy and combinations, so long as the functionalization does not adversely affect the desired properties of the compound.

The composition additionally contains about 0.02 to 3 weight percent of an organotin salt of a carboxylic acid as a condensation catalyst, which accelerate the aging of the composition. Preferably the organotin salt is selected from the group dibutyltin diacetate, stannous octoate, dibutyltin dioctoate and dibutyltin dilaurate. Most preferably the organotin salt is dibutyltin dilaurate of the formula:

The composition may contain other optional ingredients such as pigments and other fillers in minor amounts provided that the addition of the ingredients does not cause degradation of the desired properties of the cured coating made from the composition. One commonly utilized optional ingredient is a pigment, preferably a gray pigment, most preferably present in amounts up to about 1 weight percent.

The moisture curing organopolysiloxane compositions utilized in the present invention are prepared by mixing the ingredients together in the absence of moisture. The silane is moisture sensitive and will undergo cross-linking in the presence of moisture such that the mixture must be essentially absent of free moisture when the silane is added and maintained in a moisture free state until cure is desired.

A preferred method of mixing comprises mixing the polysiloxane fluids with the extending and reinforcing fillers and other optional fillers and pigments. Thereafter, the oximinosilane and organo-functional silane are added and mixed under a nitrogen atmosphere. The organotin salt is added to the mixture and the mixture is then dispensed in sealed containers for storage prior to use.

The surface to be protected is coated with the composition by conventional methods such as dipping, brushing or spraying. Preferably, the surface to be protected is coated by spraying one or more applications of the composition of the present invention. The thickness of the coating will depend upon the specific requirements of the application and the desired level of protection. The coating generally has an average thickness of 2 to 50 mm more preferably, an average thickness of 6 to 25 mm, most preferably about 10 to 25 mm. If forming the coating from one part polyorganosiloxanes, the final thickness may be built up using multiple layer coating. After the coating is formed on the surface, the surface is exposed to normal atmosphere for cross-linking and cure of the coating. For thicker coatings a thixotropic composition capable of being brushed or spread on the surface may be preferred.

The improved method of the present invention is capable of protecting surfaces from the effect of fire with excellent resistance to heat transfer that may cause damage to the structure to which the silicone composition is coated.

The following examples are included to illustrate preferred embodiments of the invention and to demonstrate the usefulness of the coating and are not intended to limit in any way the scope of protection for the invention.

EXAMPLE I

A fire resistance composition of polydiorganodisiloxane was prepared in two parts.

Part A

Part A of the formulation was prepared by mixing 44 percent by weight of polydimethyl siloxane terminated by vinyl radical (CH2=CH—), of viscosity 10,000 centipoise with 4 percent by weight of amorphous silica having a surface area of 150 m2/g treated with hexamethyldisilazane, 10 percent by weight of crystalline silica and 34 percent by weight of melamine. Then 8 percent by weight of organo-platinum catalyst was added and mixed until the mixture was a flowable homogenous paste.

Part B

Part B of the formulation was prepared by mixing 85 percent by weight of polydimethyl siloxane terminated by vinyl radical with 8 percent by weight of amorphous silica having a surface area of 150 m2/g treated with hexamethyl disilazane, 4 percent by weight of polydimethyl siloxane crosslinker having 20 mole percent of methyl radical substituted with hydride radical. Then 2 percent by weight of vinyl trimethoxy silane adhesion promoter and 1 percent by weight of 1,3-divinyltetramethyldisiloxane cross link inhibitor was added and mixed until flowable homogenous paste.

Equal volumes of Part A and Part B were mixed together, and used to form a 6 mm sheet of silicone of uniform thickness which cured in 2 hours.

Either or both of Parts A and B may be diluted with a suitable diluent to provide a composition of suitable viscosity for application by spraying.

EXAMPLE II

A composition useful for fire resistance was prepared by mixing 38 parts by weight of polydimethylsiloxane terminated by hydroxyl groups having a viscosity of 3,300 centipoise at 25° C., with 10 parts by weight of titanium dioxide of specific gravity of 4, 8 parts by weight of melamine of density 1.5 g/ml and 38 parts by weight of mixture of amorphous and crystalline silica fillers the amorphous silica having a specific gravity of 2.2 and a surface area of 150 m2/g. Then 4 parts by weight of methyl tris-(methyl ethyl ketoxime) silane, 1 part by weight of N-(2-aminoethyl-3 aminopropyl) trimethoxysilane and 0.1 part by weight of dibutyltin dilaurate are added under a nitrogen atmosphere and mixed well under the nitrogen atmosphere to uniform consistency.

A sheet of silicone of uniform thickness (6 mm) was prepared in a mould and cured at room temperature and 50% relative humidity for 7 days.

EXAMPLE III
UL 94V Flammability Test Procedure

A UL 94V test was conducted to predict the flammability rating of the cured silicone product prepared in accordance with the above examples. The material can be classified V-1, V-1 or V-2 on the basis of results.

Bar shape pieces of size 125 mm×13 mm were cut from the 6 mm sheets prepared in accordance with Example II above. The edges were rounded to smooth shape.

Methane gas supply to a burner was adjusted to a flow rate of 105 mL/minute. The burner was adjusted to produce a 20 mm blue flame. The bar sample was clamped vertically such that the top of the burner was 10 mm below the lower end of the specimen. The flame was applied at the center point of the lower end of the specimen bar. The flame was applied for 10 seconds and then moved away to a distance of 150 mm from the specimen. The time of the after flame (t1) was recorded. As soon as after flaming ceases the burner was placed immediately under the specimen at a distance of 10 mm from the lower edge of the specimen for 10 second. The burner was then moved away to a distance of 150 mm from the specimen and the after glow time (t2) was recorded.
Results t1=0 second
t2=0 second UL 94V-0 rating requires t1≦10 seconds and t2≦50 seconds.

EXAMPLE IV

In a further test, 6 mm steel thick steel bars were coated with a 6 mm coating of a composition in accordance with Example II above. The coated surface of the steel bar was subjected to the flame from a propane torch at about 1200° C. at a distance of 150 mm in direct contact with the top part of the blue flame for 4 hours. At the end of this time the area of the coating directly exposed to the flame has formed a hard char but remained structurally intact. Throughout the test there was no significant heat transfer through the coating to the steel bar observed.

EXAMPLE V

Steel bars (60 mm×5000 mm×3 mm) were coated with 20 mm and 6 mm dry film thickness prepared from coatings utilizing the component of Example II. Coating was applied in 3 coats for 20-mm thickness and in two coats for 6-mm thickness. Each subsequent coat was applied after 48 hours interval to allow full cure of the coating. After the final coat, the coating was allowed to cure for 7 days at room conditions (20° C. temperature and 40% relative humidity).

The coating on the steel bar was exposed to flame of propane torch for four hours. The coating was directly exposed to the top part of the blue flame of temperature 1200° C. A temperature sensor was installed at the backside of the steel bar and the temperature recorded on a chart recorder versus time.

Figure 2:
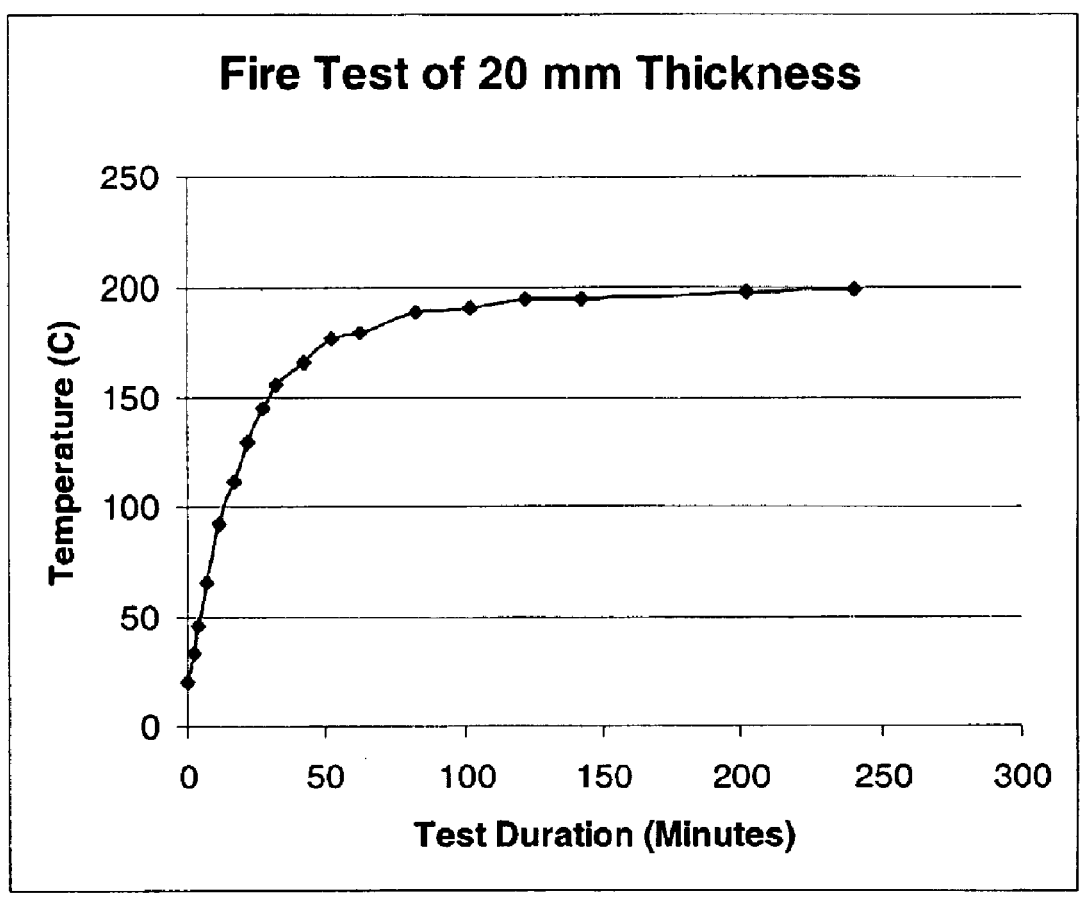
FIG. 2 is a plot of temperature versus time of exposure for 20 mm thick coating.

As shown in FIGS. 1 and 2 the plot of the temperature recorded at the back of the steel bar shows two slopes. The first slope represents a sharp rise in the temperature at the beginning of the test followed by a slow rise (second slope) to a constant temperature. The first slope was due to the burning of the silicone at the surface. The decrease in heat transfer in the second slope was due to enhanced insulation of the heat due to the burned surface layer of the silicone becoming solid silicone dioxide.

The method of the present invention protects a surface from the effects of a fire by coating the surface with at least about a 2 mm coating of a fire retardant fire resistant and heat resistant vulcanizable silicone composition. The coating of the vulcanizable silicone composition on the surface of structures resists fire with excellent resistance to heat transfer that may cause damage to the structure to which the silicone composition is coated.

The method of the present invention is of particular utility in industrial, commercial and institutional construction where it is important to protect the integrity of the structure from the possible effects of a fire. By coating structural members such as steel and concrete beams, columns and other components with the fire retardant composition in accordance with the method of the present invention, the structural integrity of the building will be protected for a significant period of time to enable the occupants of the building to leave and allowing firefighters sufficient time to bring the fire under control with reduced risk of the structure collapsing.

While the invention has been described in reference to specific embodiments it should be understood by those skilled in the art that various changes can be made and equivalents may be substituted without departing from the true spirit and scope of the invention. All such modifications are intended to be within the scope of the claims appended hereto.

We claim:

1. A method of protecting a surface from the effects of a fire comprising coating the surface with at least about a 2 mm coating of a one-part room temperature a vulcanizable polysiloxane composition wherein the one-part room temperature vulcanizable polysiloxane composition comprises the product which is obtained by mixing the following:

a) from about 20 to about 60 weight percent of one or more polydiorganosiloxane fluids of the formula $$R'[(R)_2SiO]_n(R)_2SiR'$$

in which R is a monovalent alkyl or alkenyl radical having 1 to 8 carbon atoms or a phenyl radical, R' each of which may be the same or different are OH or a monovalent alkyl or alkenyl radical having 1 to 8 carbon atoms or a phenyl radical and n has an average value such that the viscosity is from about 1 to about 100,000 centipoise at 25° C., wherein at least one of the polydiorganosiloxane fluid has one or both of R' equal to OH and n has an average value such that the viscosity is in the range from 1,000 to 100,000 centipoise at 25° C., preferably from 1,000 to 40,000 centipoise at 25° C.;

b) from 0 to about 40 weight percent of a cyclo-organosiloxane of the formula $$[(R)_2SiO]_n$$

in which R is a monovalent alkyl or alkenyl radical having 1 to 8 carbon atoms or a phenyl radical which may optionally be substituted with an alkyl radical having 1 to 8 carbon atoms and n has an average value of 3 to 10 c) from 5 to about 50 weight percent of one or more fire retardant fillers selected from the group consisting of melamine, zirconium dioxide, chromium dioxide, zinc borate, antimony oxide, alumina trihydrate and exfoliated graphite;

d) from about 0 to about 30 weight percent of one or more inorganic extending or non-reinforcing fillers d) from about 0.5 to about 10 weight percent of an amorphous $SiO_2$ reinforcing filler having a surface area of between about 50 to 300 $m^2/g$ and a particle size range between about 0.01 and 0.03 microns;

e) from about 1 to about 7 weight percent of a silane cross-linking agent of the formula;

$$RSiX_3$$

in which R is a monovalent alkyl or alkenyl radical having 1 to 8 carbon atoms or a phenyl radical which may optionally be substituted with an alkyl radical having 1 to 8 carbon atoms and X is an alkyl radical with a functional group selected from carboxyl, ketoximino, alkoxy, carbonyl and amine directly linked to the silicone atom;

f) from about 0.2 to about 3 weight percent of an organosilane adhesion promoter; and g) from about 0.02 to about 3 weight percent of an organotin salt as a condensation catalyst.

2. A method according to claim 1 wherein the cross-linking agent is an oximosilane cross-linking agent of the formula;

$$RSi(ONR'_2)_3$$

in which R and R' are independently selected from monovalent alkyl or alkenyl radicals having 1 to 8 carbon atoms or a phenyl radical which may optionally be substituted with an alkyl radical having 1 to 8 carbon atoms.

3. A method according to claim 1 wherein the composition contains only one polydiorganosiloxane fluid in which both R' are OH and from about 20 to about 30 weight percent of the cycloorganosiloxane.

4. A method according to claim 3 wherein the adhesion promoter is a compound of the formula $$\begin{array}{c} \text{NHCH}_2\text{CH}_2\text{NH}_2 \\ \diagup \\ \text{CH}_2 \\ \diagdown \\ \text{CH}_2\text{CH}_2\text{Si}(\text{OMe})_3 \end{array}$$

wherein Me is the methyl radical.

5. A method according to claim 4 wherein the organotin salt is an organotin salt of a carboxylic acid selected from the group consisting of dibutyltindiacetate, stannous octoate and dibutyltin dioctoate.

6. A method according to claim 5 wherein the organotin salt of a carboxylic acid is a compound of the formula $$(C_4H_9)_2Sn(OCOC_{10}H_{20}CH_3)_2.$$

* * * * *

UNITED STATES PATENT AND TRADEMARK OFFICE
CERTIFICATE OF CORRECTION

PATENT NO. : 6,878,410 B2  Page 1 of 1
DATED : April 12, 2005
INVENTOR(S) : Farooq Ahmed It is certified that error appears in the above-identified patent and that said Letters Patent is hereby corrected as shown below:

<u>Column 4,</u>
Lines 33, 36 and 40, "alkylene" should read -- alkenyl -- (each occurance).

Signed and Sealed this

Eighteenth Day of April, 2006

JON W. DUDAS
*Director of the United States Patent and Trademark Office*